United States Patent Office 3,249,508
Patented May 3, 1966

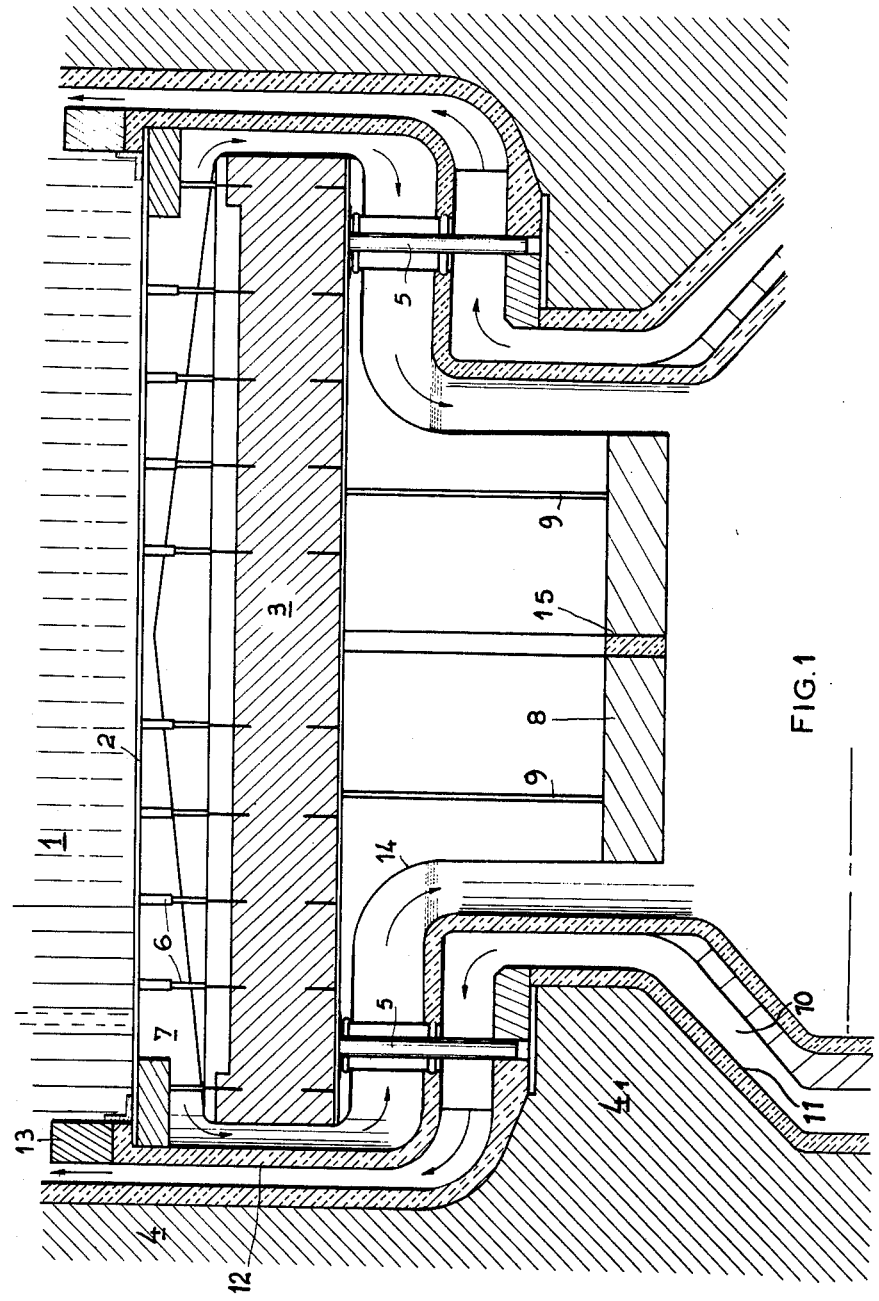

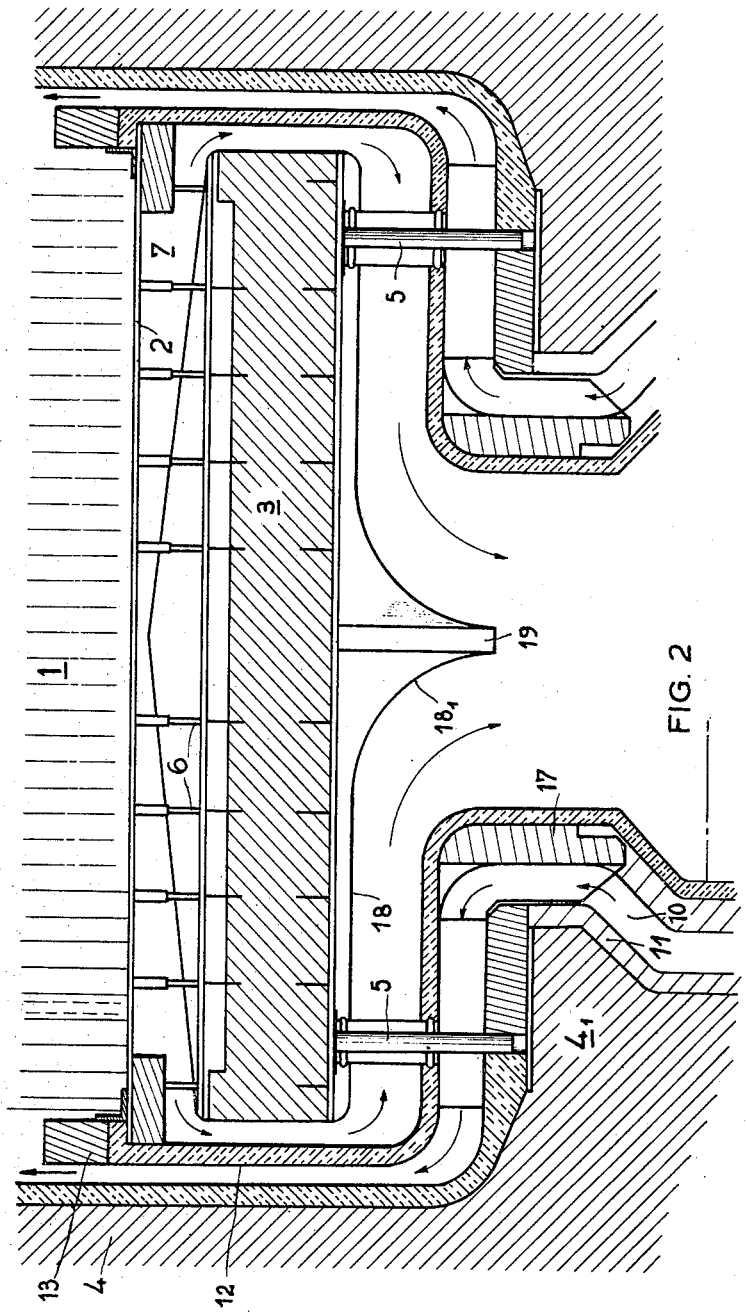

3,249,508
GAS COOLED NUCLEAR REACTOR SYSTEM HAVING IMPROVED SHIELD AND FLOW PATH ARRANGEMENT
Claude Georges Rachais, Paris, France, assignor to Electricite de France (Service National), Paris, France
Filed Dec. 16, 1963, Ser. No. 330,985
Claims priority, application France, June 21, 1963, 939,032
8 Claims. (Cl. 176—59)

This invention relates to gas-cooled nuclear reactor assemblies of the "built-in" exchange type and more specifically relates to improvements in the biological shield interposed between the core and the heat exchangers of such reactors.

Prior art reactors of the built-in type have been designed with a common pressure vessel which contains the heat exchangers for thermal exchange between the gas coolant (generally carbon dioxide) and a secondary fluid (generally water and/or steam) and the reactor core, located above the heat exchangers and separated therefrom by a biological shield. Such reactors are of particular interest when the pressure vessel consists of a prestressed concrete vessel adapted to provide both containment and biological protection against radiation from the core and gas coolant loop.

A primary object of the invention is to provide a reactor assembly of the built-in exchanger type having an improved biological shield construction.

Another object of the invention is to provide a nuclear reactor assembly of the built-in exchanger type having a biological shield insuring protection of the exchangers against direct radiation from the core and impressing a minimum of head loss to the primary coolant flow.

Other objects and features of the invention will appear from the following description which refers to the accompanying drawings wherein:

FIG. 1 is a schematic vertical cross-section view of a nuclear reactor assembly according to one embodiment of the invention;

FIG. 2, similar to FIG. 1, illustrates a modified embodiment of the invention.

Referring to FIG. 1, there is shown a part of a nuclear reactor essentially consisting of a core 1 which rests on a stack plate 2 supported on a base plate 3 filled with a nuclear radiation shielding material and which is in turn supported on an annular corbel $4_1$ formed from the side wall 4 which partially defines the pressure vessel and biological shield structure of the reactor. For a more complete description of the overall construction reference may be had for instance to French Patent 1,351,514 in the name of the assignee of the present invention.

The base plate 3 is preferably supported on the corbel $4_1$ by roller supports 5 which are spaced apart at regular intervals along this annular corbel.

There have been shown in this figure neither the heat exchangers which are located within the pressure vessel beneath the base plate 3, the upper surface of the heat exchanges being schematically shown by dash-dot lines nor all the circulation systems for the coolant gas which is conveyed in the cold state to the top of the reactor core 1, then caused to flow downwardly through this latter while picking up heat, then directed to the exchangers so as to be cooled therein before being returned in the cold state to the reactor core 1.

In FIG. 1, there are shown at 6 the support stools which ensure the mechanical rigidity of the stack plate 2 relatively to the base plate 3, the said support stools making it possible to form between the said stack plate 2 and the base plate 3 a free space 7 which serves as a collector for the hot gas which is derived from the core 1.

The reactor which is shown in FIG. 1 additionally comprises a nuclear radiation shielding element 8 which is constructed in the form of a disc and disposed beneath the base plate 3 that is to say between this latter and the exchangers (not shown), the said shielding element 8 being intended to complete the protection provided by the base plate 3 and to effect the absorption of the radiation emitted by the core 1 in the direction of the exchangers. This shielding element 8 is preferably suspended from the base plate by means of tie-rods 9.

The dimensions of the shielding element 8 as well as its arrangement relatively to the corbel $4_1$ are such that they provide between its periphery and the corbel $4_1$ on the one hand a passageway for the ducts 10 which convey cold gas to the reactor core and on the other hand serve to guide the hot gas from the core 1 towards the exchangers (not shown).

The ducts 10 which convey cold gas to the reactor core 1 are disposed between a heat-insulating lining 11, which covers the side wall of the pressure vessel 4 as well as the corbel $4_1$, and a shell 12 whose mechanical rigidity is ensured at the top portion thereof by a stiffening ring 13.

The path of the hot gases from the reactor core to the exchangers is delimited on the one hand by the shell 12 and on the other hand by a shield casing 14 which encloses the base plate 3 and the shielding element 8. This casing 14 which is preferably provided with a connecting portion between the base plate 3 and the shielding element 8, mainly plays the part of deflector for the hot gas which is derived from the reactor core 1 and which flows towards the exchangers.

The internal volume delimited by this shield casing 14 which surrounds the base plate 3 and the shielding element 8 is put into gaseous communication through one or a number of holes or through the intermediary of a means such as a filter 15 with the atmosphere which prevails within the pressure vessel, the object thereof being to balance the pressure in the interior of the casing with that of the pressure vessel. The use of a filter corresponds, for example, to the case in which it is necessary to protect the reactor from dust particles which are liable to fall from the nuclear radiation shielding material located in the base plate.

In the alternative form of embodiment of the reactor in accordance with the invention which is shown in FIG. 2, the same references have been given to the elements which have already been described in connection with the form of embodiment of FIG. 1.

In this alternative form of embodiment, the nuclear radiation shielding element which completes the protection afforded by the base plate so as to effect the absorption of radiation emitted by the core no longer has the shape of a flat disc (as in the reactor of FIG. 1) but that of a ring 17. This ring 17 is made integral with the corbel $4_1$ forming part of the pressure vessel wall 4 while nevertheless making provision between the said ring and the said corbel for a space of sufficient width to provide a passageway for the ducts 10 which are intended to convey cold gas to the reactor core.

In the alternative form of embodiment which is shown in FIG. 2, the shell 12 covers the shield ring 17, the arrangement of this latter making it possible to afford a large cross-sectional area for the flow of hot gas derived from the reactor core.

In order to guide the hot gas towards the exchangers (not shown), the base plate 3 of the reactor is surrounded by a shield casing 18, the bottom wall of which is provided with a deflecting portion $18_1$ having a flared shape of revolution with a downwardly decreasing cross-section. This deflection portion $18_1$ is preferably provided with means such as the filter 19 which make it possible to balance the pressure in the interior of the volume which is delimited by the casing 18 with that of the pressure vessel.

The invention is obviously not limited to the embodiments which have been described and illustrated and modifications may be made without departing from the scope and spirit of the claims.

I claim:

1. In a gas cooled nuclear reactor assembly, a concrete pressure and biological protection vessel having a vertical axis, a pressure tight chamber in said vessel, an annular internal flange integral with said vessel and projecting radially inward from said vessel into said chamber, a reactor core unit located in an upper portion of said chamber above said flange and provided with vertical channels receiving nuclear fuel elements, heat exchangers located in a lower portion of said chamber under said flange, biological protection shield in said upper portion between said core and said heat exchangers including a gas impervious base plate and neutron-absorbent material, means for transferring the weight of said core to said plate, means between said plate and said flange for transferring the weight of said plate to said flange and a neutron-absorbent shield element disposed beneath said plate adjacent to said flange, said plate having a smaller diameter than that of the adjacent wall of said pressure vessel providing passages between the periphery of said plate and said pressure vessel for cold gas to said reactor core and for hot gas from said core to said exchangers, said plate and said shield element preventing direct neutron streaming from said core to said heat exchangers.

2. A nuclear reactor assembly as described in claim 1, said shield element comprising a disc shaped member suspended from said plate and a shield casing connecting said disc shaped member and said plate for guiding the hot gas from said reactor core to said exchangers between said plate and said disc.

3. A nuclear reactor assembly as described in claim 1, said nuclear radiation shielding element comprising a ring shaped member secured to the lateral wall of said flange and defining therewith an annular passage and ducts in said passage conveying cold gas from said heat exchanger to said reactor core.

4. A nuclear reactor assembly as described in claim 3 including a shield casing for said base plate located under said base plate and having a flared shape of revolution with a downwardly decreasing cross-section deflecting the hot gas from said reactor core.

5. A nuclear reactor assembly as described in claim 4, said shield casing being provided with means for balancing the pressure of the volume within said casing with that of said pressure vessel.

6. A nuclear reactor assembly as described in claim 5, said pressure balancing means including a filter.

7. In a gas cooled nuclear reactor assembly, a concrete pressure and biological protection vessel having a vertical axis, a pressure tight chamber in said vessel, an annular internal flange integral with said vessel and projecting radially inward from said vessel into said chamber, a reactor core unit located in an upper portion of said chamber above said flange and provided with vertical channels receiving nuclear fuel elements, heat exchangers located in a lower portion of said chamber under said flange, a biological protection shield in said upper portion between said core and said heat exchangers including a gas impervious base plate and neutron absorbent material, means for transferring the weight of said core to said plate, means between said plate and said flange for transferring the weight of said plate to said flange, a neutron-absorbent shield element disposed beneath said plate adjacent to said flange, said plate having a smaller diameter than that of the adjacent wall of said pressure vessel providing passages between the periphery of said plate and said pressure vessel for cold gas to said reactor core and for hot gas from said core to said exchanger, said plate and said shield element preventing direct neutron streaming from said core to said heat exchangers, said shield element comprising a disc shaped member suspended from said plate, a shield casing connecting said disc shaped member and said plate for guiding the hot gas from said reactor core to said exchangers between said base plate and said disc, said shield casing defining an internal chamber and means for admitting the atmosphere which prevails within said pressure vessel to said chamber for balancing the pressures in said casing and in said pressure vessel.

8. A nuclear reactor as described in claim 7, said means for admitting the atmosphere to said internal chamber including a filter whereby the reactor is protected against dust particles falling from said nuclear radiation shielding material in said base plate.

References Cited by the Examiner

UNITED STATES PATENTS

| 3,105,805 | 10/1963 | Rodwell | 176—60 X |
| 3,159,549 | 12/1964 | Moore et al. | 176—60 X |
| 3,170,846 | 2/1965 | Blumberg | 176—60 X |

FOREIGN PATENTS

| 1,332,043 | 6/1963 | France. |
| 1,345,745 | 11/1963 | France. |

OTHER REFERENCES

Muller: German Application No. 1,126,527, printed March 29, 1962 (KL 21g 21/20), 1 sht. dwg., 2 pp. spec.

LEON D. ROSDOL, *Primary Examiner.*

L. DEWAYNE RUTLEDGE, *Examiner.*